United States Patent
Hawkins et al.

(10) Patent No.: US 8,240,327 B2
(45) Date of Patent: Aug. 14, 2012

(54) PRESSURE LOADED SERVICE REGULATOR WITH PRESSURE BALANCED TRIM

(75) Inventors: James C. Hawkins, Allen, TX (US); Paul R. Anderson, Zimmerman, MN (US); Jason S. Mevius, McKinney, TX (US); Gregory L. Foust, Plano, TX (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 676 days.

(21) Appl. No.: 12/427,435

(22) Filed: Apr. 21, 2009

(65) Prior Publication Data

US 2010/0071786 A1    Mar. 25, 2010

Related U.S. Application Data

(60) Provisional application No. 61/046,786, filed on Apr. 21, 2008.

(51) Int. Cl.
*F16K 31/385* (2006.01)
(52) U.S. Cl. ........... 137/489.5; 137/505.12; 137/505.15; 137/505.46
(58) Field of Classification Search ............... 137/489.5, 137/505.12, 505.15, 505.46
See application file for complete search history.

(56) References Cited

U.S. PATENT DOCUMENTS

| | | |
|---|---|---|
| 1,945,834 A | 2/1934 | Terry |
| 2,042,781 A | 6/1936 | Grove |
| 2,261,364 A | 11/1941 | Grove |
| 2,273,111 A | 2/1942 | Kindl ................................. 50/11 |
| 2,599,577 A | 6/1952 | Norgren |
| 2,619,983 A | 12/1952 | Roberts |
| 2,624,980 A | 1/1953 | Hughes ............................. 50/11 |
| 2,664,674 A | 1/1954 | Niesemann |
| 3,086,548 A | 4/1963 | Galiger et al. |
| 3,392,749 A | 7/1968 | Gneiding et al. |
| 3,424,194 A | 1/1969 | Kruzan et al. |
| 3,542,052 A | 11/1970 | Irwin |
| 3,654,948 A * | 4/1972 | Nelson ....................... 137/489.5 |
| 3,722,536 A | 3/1973 | Hill et al. |
| 3,742,972 A | 7/1973 | Hughes |
| 3,749,120 A * | 7/1973 | Love et al. ................. 137/489.5 |

(Continued)

FOREIGN PATENT DOCUMENTS

DE    35 32 751 A1    3/1987

(Continued)

OTHER PUBLICATIONS

International Search Report, International Application No. PCT/US2009/041257, mailed Aug. 14, 2009.

(Continued)

*Primary Examiner* — Eric Keasel
(74) *Attorney, Agent, or Firm* — Marshall, Gerstein & Borun LLP

(57) ABSTRACT

A gas regulator includes an actuator, a regulator valve, and pressure loading device. The pressure loading device provides a pressure load to a surface of a diaphragm of the actuator to act against a downstream pressure being applied to the opposite surface of the diaphragm and being controlled by the regulator. As the downstream pressure varies and the diaphragm displaces to move a control element to regulate the downstream pressure, the pressure loading device maintains a specified load pressure. The regulator may further include a balanced trim applying a balancing force to offset a force of an upstream pressure on the control element.

27 Claims, 4 Drawing Sheets

U.S. PATENT DOCUMENTS

| | | | |
|---|---|---|---|
| 3,796,368 A * | 3/1974 | Katchka | 137/489.5 |
| 4,176,677 A | 12/1979 | Hughes | 137/488 |
| 5,161,576 A | 11/1992 | Hekkert et al. | |
| 5,285,810 A | 2/1994 | Gotthelf | |
| 5,586,569 A | 12/1996 | Hanning et al. | |
| 5,967,176 A * | 10/1999 | Blann et al. | 137/489.5 |
| 6,192,912 B1 | 2/2001 | Butler et al. | |
| 6,354,319 B1 | 3/2002 | Mooney | |
| 6,796,326 B2 | 9/2004 | Bayer | |
| 6,886,583 B2 | 5/2005 | Matsushima et al. | |
| 6,923,197 B2 | 8/2005 | Vitale | |
| 2004/0187930 A1 | 9/2004 | Hawkins et al. | 137/505.47 |
| 2005/0011554 A1 | 1/2005 | Davila et al. | |
| 2006/0086919 A1 | 4/2006 | Yang | |
| 2007/0272316 A1 | 11/2007 | Zecchi et al. | |
| 2008/0258096 A1 | 10/2008 | Hawkins | |

FOREIGN PATENT DOCUMENTS

| | | |
|---|---|---|
| DE | 40 12 801 A1 | 10/1991 |
| DE | 295 06 395 U1 | 6/1995 |
| DE | 198 21 292 A1 | 11/1999 |
| FR | 2 451 597 | 10/1980 |
| WO | WO-99/23544 A1 | 5/1999 |

OTHER PUBLICATIONS

Written Opinion of the International Searching Authority, mailed Aug. 14, 2009.

Australian Office Action for Application No. 2008242823, dated Aug. 25, 2011.

Emerson Process Management, "64 Series Pressure Reducing Regulator," Natural Gas Regulators Application Guide—Edition V, pp. 367-379 (2005).

Emerson Process Management, "66 Series Pressure Reducing Regulators," Natural Gas Regulators Application Guide—Edition V, pp. 29-72 (2005).

Emerson Process Management, "Principles of Direct-Operated Regulators," Natural Gas Regulators Application Guide—Edition V, pp. 471-476 (2005).

Emerson Process Management, "Principles of Series Regulation and Monitor Regulators," Natural Gas Regulators Application Guide—Edition V, pp. 493-495 (2005).

Emerson Process Management, "REGAL 2 Series Pressure Reducing Regulator," Natural Gas Regulators Application Guide—Edition V, pp. 239-245 (2005).

Emerson Process Management, "S200 Series Pressure Reducing Regulators," Natural Gas Regulators Application Guide—Edition V, pp. 259-272 (2005).

Emerson Process Management, "S300 Series Pressure Reducing Regulators," Natural Gas Regulators Application Guide—Edition V, pp. 289-306 (2005).

Emerson Process Management, "Selecting and Sizing Pressure Reducing Regulators," Natural Gas Regulators Application Guide—Edition V, pp. 479-483 (2005).

Emerson Process Management, "Type 63EG Relief Valve/Backpressure Regulator," Natural Gas Regulators Application Guide—Edition V, pp. 329-340 (2005).

Emerson Process Management, "Type EZL Pressure Reducing Regulator for Low Differential Pressure Applications," Natural Gas Regulators Application Guide—Edition V, pp. 169-179 (2005).

International Preliminary Report on Patentability for Application No. PCT/US2008/060645, dated Jun. 22, 2010.

International Preliminary Report on Patentability for Application No. PCT/US2009/041001, dated Aug. 30, 2011.

International Preliminary Report on Patentability for Application No. PCT/US2009/041257, dated Oct. 26, 2010.

International Preliminary Report on Patentability for Application No. PCT/US2009/041259, dated Oct. 26, 2010.

International Search Report and Written Opinion for Application No. PCT/US2008/060645, dated Apr. 17, 2008.

International Search Report and Written Opinion for Application No. PCT/US2009/041001, dated Aug. 25, 2011.

International Search Report and Written Opinion for Application No. PCT/US2009/041259, dated Oct. 15, 2010.

* cited by examiner

PRESSURE LOADED SERVICE REGULATOR WITH PRESSURE BALANCED TRIM

CROSS-REFERENCE TO RELATED APPLICATIONS

This application claims the benefit of priority to U.S. Provisional Patent Application No. 61/046,786, filed on Apr. 21, 2008, entitled "Pressure Loaded Service Regulator with Pressure Balanced Trim," which is hereby expressly incorporated by reference herein

FIELD OF THE INVENTION

The present invention relates to fluid flow regulating devices such as gas regulators and, more particularly, to gas regulators having pressure loading devices as well as pressure balanced trim for regulating an outlet pressure proximate a predetermined setpoint pressure.

BACKGROUND

The pressure at which typical gas distribution systems supply gas may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of a gas regulator. Therefore, gas regulators are implemented into these distribution systems to ensure that the delivered gas meets the requirements of the end-user facilities. Conventional gas regulators generally include a closed-loop control actuator for sensing and controlling the pressure of the delivered gas.

In addition to a closed loop control, some conventional gas regulators include a relief valve. The relief valve is adapted to provide over pressure protection when the regulator or some other component of the fluid distribution system fails, for example. Accordingly, in the event the delivery pressure rises above a predetermined threshold pressure, the relief valve opens to exhaust at least a portion of the gas to the atmosphere, thereby reducing the pressure in the system.

FIGS. 1 and 2 depict one conventional gas regulator 10. The regulator 10 generally comprises an actuator 12 and a regulator valve 14. The regulator valve 14 defines an inlet 16 for receiving gas from a gas distribution system, for example, and an outlet 18 for delivering gas to an end-user facility such as a factory, a restaurant, an apartment building, etc. having one or more appliances, for example. Additionally, the regulator valve 14 includes a valve port 20 disposed between the inlet and the outlet. Gas must pass through the valve port 20 to travel between the inlet 16 and the outlet 18 of the regulator valve 14.

The actuator 12 is coupled to the regulator valve 14 to ensure that the pressure at the outlet 18 of the regulator valve 14, i.e., the outlet pressure, is in accordance with a desired outlet or control pressure. The actuator 12 is therefore in fluid communication with the regulator valve 14 via a valve mouth 22 and an actuator mouth 24. The actuator 12 includes a control assembly 26 for sensing and regulating the outlet pressure of the regulator valve 14. Specifically, the control assembly 26 includes a diaphragm 28, a piston 30, and a control arm 32 having a valve disc 34. The conventional valve disc 34 includes a generally cylindrical body 36 and a sealing insert 38 fixed to the body 36. The valve body 36 may also include a circumferential flange 40 integrally formed therewith, as depicted in FIG. 2. The diaphragm 28 senses the outlet pressure of the regulator valve 14. The control assembly 26 further includes a control spring 42 in engagement with a top-side of the diaphragm 28 to offset the sensed outlet pressure. Accordingly, the desired outlet pressure, which may also be referred to as the control pressure, is set by the selection of the control spring 42.

The diaphragm 28 is operably coupled to the control arm 32, and therefore, the valve disc 34 via the piston 30, controls the opening of the regulator valve 14 based on the sensed outlet pressure. For example, when an end user operates an appliance, such as a furnace, for example, that places a demand on the gas distribution system downstream of the regulator 10, the outlet flow increases, thereby decreasing the outlet pressure. Accordingly, the diaphragm 28 senses this decreased outlet pressure. This allows the control spring 42 to expand and move the piston 30 and the right-side of the control arm 32 downward, relative to the orientation of FIG. 1 as shown in FIG. 2. This displacement of the control arm 32 moves the valve disc 34 away from the valve port 20 to open the regulator valve 14. FIG. 2 depicts the valve disc 34 in a normal, open operating position. So configured, the appliance may draw gas through the valve port 20 toward the outlet 18 of the regulator valve 14.

In the conventional regulator 10 depicted in FIG. 1, the control assembly 26 further functions as a relief valve, as mentioned above. Specifically, the control assembly 26 also includes a relief spring 44 and a release valve 46. The diaphragm 28 includes an opening 48 through a central portion thereof and the piston 30 includes a sealing cup 50. The relief spring 44 is disposed between the piston 30 and the diaphragm 28 to bias the diaphragm 28 against the sealing cup 50 to close the opening 48, during normal operation. Upon the occurrence of a failure such as a break in the control arm 32, the control assembly 26 is no longer in direct control of the valve disc 34 and inlet flow will move the valve disc 34 will move into an extreme open position. This allows a maximum amount of gas to flow into the actuator 12. Thus, as the gas fills the actuator 12, pressure builds against the diaphragm 28 forcing the diaphragm 28 away from the sealing cup 50, thereby exposing the opening 48. The gas therefore flows through the opening 48 in the diaphragm 28 and toward the release valve 46. The release valve 46 includes a valve plug 52 and a release spring 54 biasing the valve plug 52 into a closed position, as depicted in FIG. 2. Upon the pressure within the actuator 12 and adjacent the release valve 46 reaching a predetermined threshold pressure, the valve plug 52 displaces upward against the bias of the release spring 54 and opens, thereby exhausting gas into the atmosphere and reducing the pressure in the regulator 10.

A regulator's performance is dictated by the volume of a fluid that can be transferred downstream while maintaining a designated outlet pressure. In the conventional regulator 10, the control spring 42 inherently generates less force as it expands towards an uncompressed length when displacing the control arm 32 to open the valve port 20. Additionally, as the control spring 42 expands, the diaphragm 28 deforms, which increases the area of the diaphragm 28. The decreased force supplied by the control spring 42 and the increased area of the diaphragm 28 in this operational scenario combine to create a regulator response wherein the force provided by the control spring 42 cannot adequately balance the force generated by the diaphragm 28 thereby resulting in an outlet control pressure that is less than that originally set by the user. This phenomenon is known as "droop." When "droop" occurs, the outlet pressure decreases below its set control pressure and the regulator 10 may not function as intended. As the outlet pressure decreases, the amount of fluid transferred while maintaining the outlet pressure range, also know as the rated flow value, is decreased. Consequently, a need exists for improving the performance of conventional regulators by reducing or eliminating the effects of "droop" on the regulator's ability to maintain the outlet control pressure at a desired setpoint pressure and to maximize the volume of fluid flowing through the regulator valve.

Another factor affecting the performance of the regulator 10 is the force of the upstream pressure on the valve disc 34. When the actuator 12 is in the open position as shown in FIG. 2, the upstream pressure of the fluid passing through the valve port 20 applies a force on the valve disc 34 in the direction of the open position. Consequently, the magnitude of the upstream pressure and its fluctuations can affect the performance of the actuator 12 in maintaining the downstream pressure at the desired setpoint pressure. For example, as the upstream pressure increases, a greater downstream pressure is necessary to cause the actuator assembly 26 to move the valve disc 34 toward the valve port 20 to decrease the fluid flow through the valve 14. The problem is heightened in regulators with larger port sizes that can experience higher inlet pressures. In some implementations, it is necessary to install regulators having lower rated capacities to avoid over pressurizing the downstream portion of the system. Consequently, a need further exists for gas regulators that are less sensitive to upstream pressure variations at the valve port.

SUMMARY OF THE INVENTION

In one aspect, the invention is directed to a fluid regulating device that may include a valve having a first inlet, a first outlet, and a first valve port disposed between the first inlet and the first outlet, and an actuator coupled to the valve. The actuator may include a housing coupled to the valve, a first valve disc disposed within the valve and adapted for displacement between a closed position engaging the first valve port and an open position disposed away from the first valve port, and a first diaphragm disposed within the housing and dividing the housing into a first cavity and a second cavity, with the first diaphragm being operatively coupled to the first valve disc, and with the first cavity of the housing being in fluid communication with the first outlet of the valve. The fluid regulating device may further include a pressure loading device coupled to the valve and to the actuator. The pressure loading device may include a body having a second inlet, a second outlet, and a second valve port disposed between the second inlet and the second outlet, wherein the second inlet is in fluid communication with the first inlet, and the second outlet is in fluid communication with the second cavity of the housing, a bonnet coupled to the body, a second valve disc disposed within the body and adapted for displacement between a closed position engaging the second valve port and an open position disposed away from the second valve port, a second diaphragm disposed within the bonnet and dividing the bonnet into a first cavity and a second cavity, with the second diaphragm being operatively coupled to the second valve disc, and with the first cavity of the bonnet being in fluid communication with the second outlet, and a control spring disposed within the second cavity of the bonnet and engaging the second diaphragm. The second diaphragm and the control spring may be configured to cause the second valve disc to move toward its open position when the pressure at the second outlet decreases and to cause the second valve disc to move toward its closed position when the pressure at the second outlet increases to maintain a pressure within the second cavity of the actuator approximately equal to a load pressure, and the actuator may be configured to cause the first valve disc to move toward its open position when the pressure at the first outlet decreases and to cause the first valve disc to move toward its closed position when the pressure at the first outlet increases to maintain the pressure at the first outlet approximately equal to a setpoint pressure.

In another aspect, the present invention is directed to a fluid regulating device having a valve and an actuator coupled to the valve, wherein the valve has a first inlet, a first outlet, and a first valve port disposed between the first inlet and the first outlet, and the actuator has a first valve disc adapted for displacement between a closed position engaging the first valve port and an open position disposed away from the first valve port, and a first diaphragm dividing the actuator into a first cavity and a second cavity with the first cavity being in fluid communication with the first outlet of the valve, wherein the first diaphragm is operatively coupled to the first valve disc to move the first valve disc between the open and closed positions. The improvement in the fluid regulating device may include a pressure loading device coupled to the valve and to the actuator, with the pressure loading device having a body having a second inlet, a second outlet, and a second valve port disposed between the second inlet and the second outlet, wherein the second inlet is in fluid communication with the first inlet, and the second outlet is in fluid communication with the second cavity of the actuator, a bonnet coupled to the body, a second valve disc disposed within the body and adapted for displacement between a closed position engaging the second valve port and an open position disposed away from the second valve port, a second diaphragm disposed within the bonnet and dividing the bonnet into a first cavity and a second cavity, with the second diaphragm being operatively coupled to the second valve disc, and with the first cavity of the bonnet being in fluid communication with the second outlet, and a control spring disposed within the second cavity of the bonnet and engaging the second diaphragm. The second diaphragm and the control spring may be configured to cause the second valve disc to move toward its open position when the pressure at the second outlet decreases and to cause the second valve disc to move toward its closed position when the pressure at the second outlet increases to maintain a pressure within the second cavity of the actuator approximately equal to a load pressure, and the actuator may be configured with the load pressure bearing upon the first diaphragm to cause the first valve disc to move toward its open position when the pressure at the first outlet decreases and to cause the first valve disc to move toward its closed position when the pressure at the first outlet increases to maintain the pressure at the first outlet approximately equal to a setpoint pressure.

In a further aspect, the invention is directed to a fluid regulating device that may include a valve having a first inlet, a first outlet, and a first valve port disposed between the first inlet and the first outlet, and an actuator coupled to the valve. The actuator may include a first valve disc disposed within the valve and adapted for displacement between a closed position engaging the first valve port and an open position disposed away from the first valve port, and a first diaphragm operatively coupled to the first valve disc to move the first valve disc between the open and closed positions, wherein a first surface of the first diaphragm is in fluid communication with the first outlet of the valve. The fluid regulating device may further include a pressure loading device coupled to the valve and to the actuator, and the pressure loading device may have a second inlet and a second outlet with the second inlet being in fluid communication with the first inlet, and the second outlet being in fluid communication with a second surface of the first diaphragm, where the pressure loading device is configured to increase a fluid flow through the pressure loading device when the pressure at the second outlet is less than a load pressure and a second valve port disposed between the second inlet and the second outlet. The second inlet may be in fluid communication with the first inlet, and the second outlet may be in fluid communication with the second cavity of the housing. The pressure loading device may be configured to increase a fluid flow through the device when the pressure at the second outlet decreases and to decrease a fluid flow through the device when the pressure at the second outlet increases to maintain a pressure against the second surface of the first diaphragm approximately equal to a load pressure, and the actuator may be configured to cause the first valve disc to move toward its open position when the pressure at the first outlet decreases and to cause the first valve disc to move toward its closed position when the pressure at the first outlet increases to maintain the pressure at the first outlet approximately equal to a setpoint pressure.

Additional aspects of the invention are defined by the claims of this patent.

DETAILED DESCRIPTION

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning Finally, unless a claim element is defined by reciting the word "means" and a function without the recital of any structure, it is not intended that the scope of any claim element be interpreted based on the application of 35 U.S.C. §112, sixth paragraph.

Figure 3:
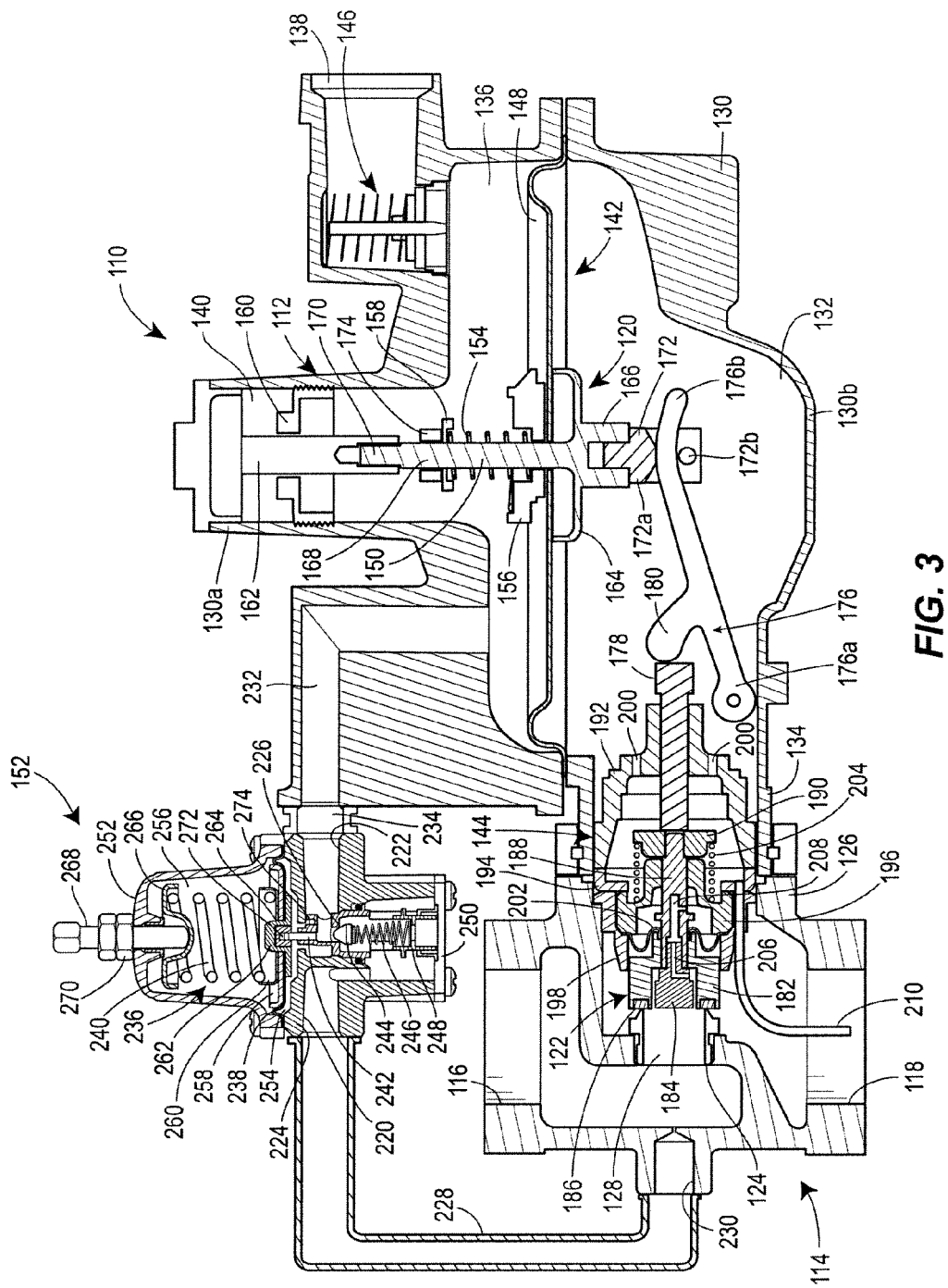
FIG. 3 is a side cross-sectional view of a gas regulator having a pressure loading device and balanced trim in accordance with the present disclosure in a closed position.
Figure 4:
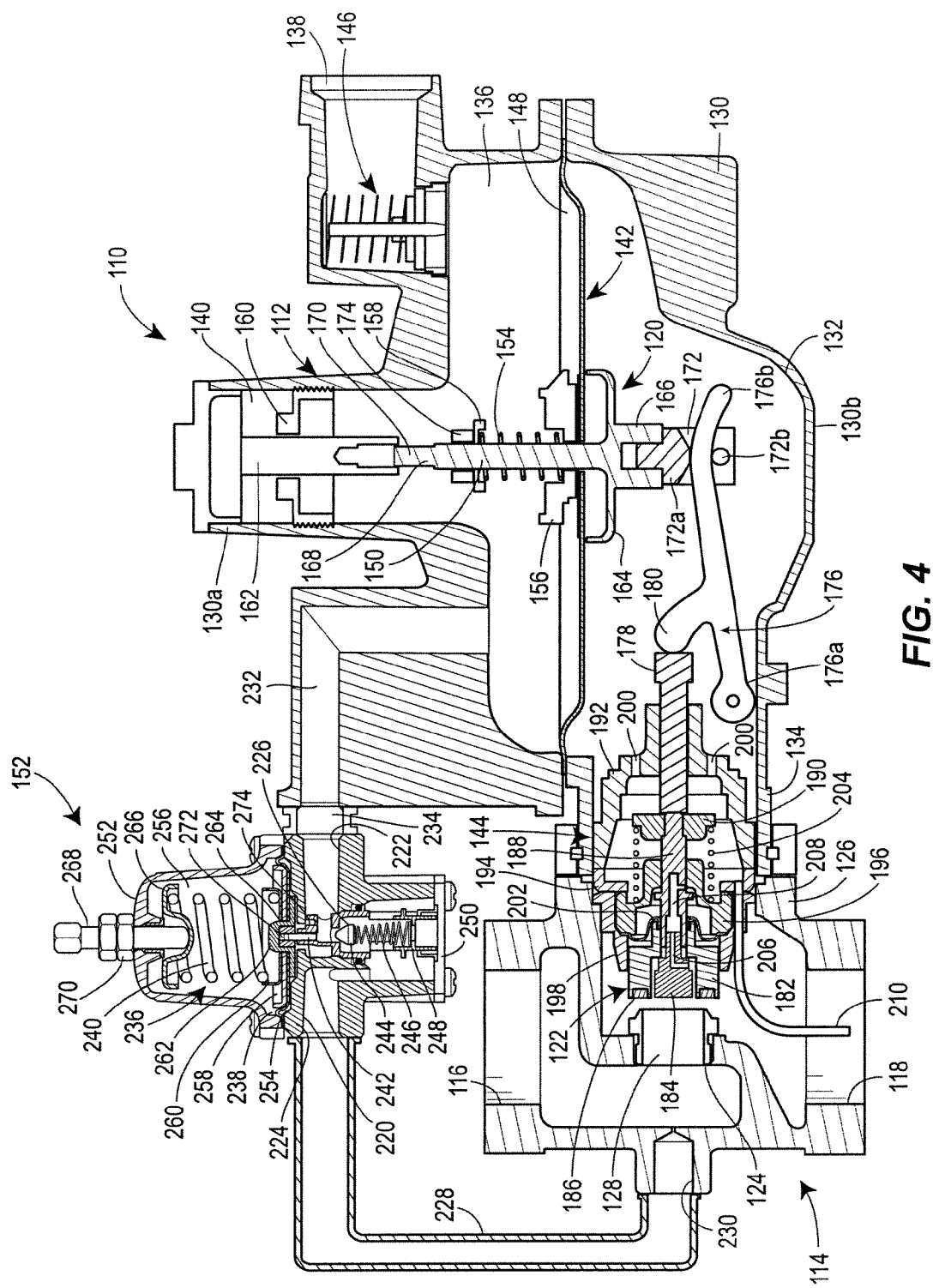
FIG. 4 is a side cross-sectional view of a gas regulator of FIG. 3.

FIGS. 3 and 4 depict a gas regulator 110 constructed in accordance with one embodiment of the present invention. The gas regulator 110 generally comprises an actuator 112 and a regulator valve 114. The regulator valve 114 includes an inlet 116 for receiving gas from a gas distribution system, for example, and an outlet 118 for delivering gas to a facility having one or more appliances, for example. The actuator 112 is coupled to the regulator valve 114 and includes a control assembly 120 having a control element, such as a valve disc 122. During a first or normal operational mode, the control assembly 120 senses the pressure at the outlet 118 of the regulator valve 114, i.e., the outlet pressure, and controls a position of the valve disc 122 such that the outlet pressure approximately equals a predetermined setpoint or control pressure.

With continued reference to FIG. 3, the regulator valve 114 defines a throat 124 and a valve mouth 126. The throat 124 is disposed between the inlet 116 and the outlet 118, and has a valve port 128 disposed therein. Gas must travel through the valve port 128 to travel between the inlet 116 and the outlet 118 of the regulator valve 114. The valve port 128 is removable from the regulator valve 114 such that it may be replaced with a different valve port having a bore of a different diameter or configuration to tailor operational and flow characteristics of the regulator valve 114 to a specific application. In the disclosed embodiment, the valve mouth 126 defines an opening disposed along an axis that is generally perpendicular to an axis of the inlet 116 and outlet 118 of the regulator valve 114.

The actuator 112 includes a housing 130 and the control assembly 120, as mentioned above. The housing 130 includes an upper housing component 130a and a lower housing component 130b secured together with a plurality of fasteners, for example. The lower housing component 130b defines a control cavity 132 and an actuator mouth 134. The actuator mouth 134 is connected to the valve mouth 126 of the regulator valve 114 to provide fluid communication between the actuator 112 and the regulator valve 114. The upper housing component 130a defines a pressure loading cavity 136 and an inlet port 138. The upper housing component 130a further defines a tower portion 140 for accommodating a portion of the control assembly 120, as will be described.

Figure 1:
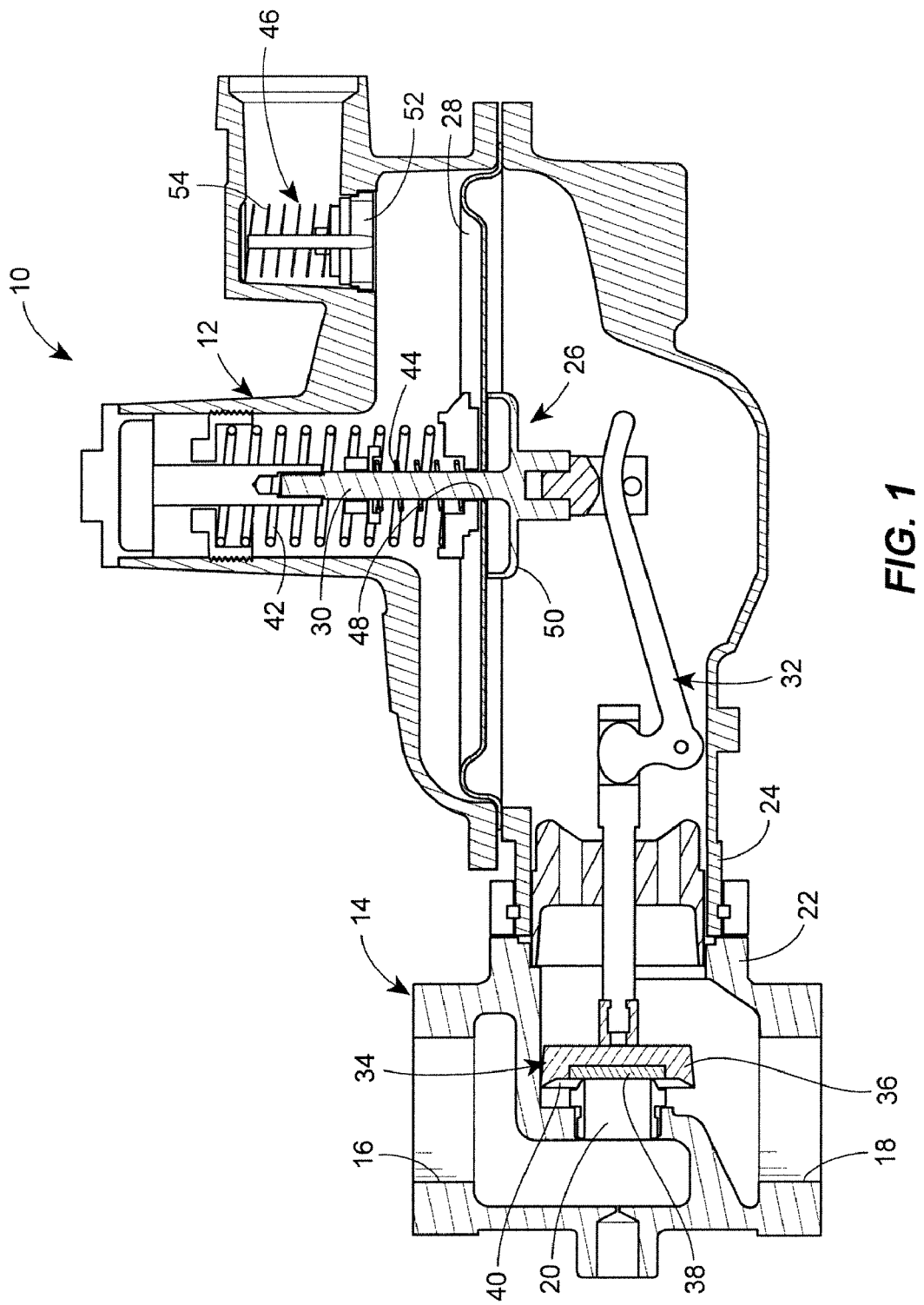
FIG. 1 is a side cross-sectional view of a conventional gas regulator in a closed position.

The control assembly 120 includes a diaphragm subassembly 142 and a disc and balancing subassembly 144. The diaphragm subassembly 142 includes a diaphragm 148, a piston 150, a pressure loading device 152, a lock-up spring 154, a lock-up spring seat 156 and a piston guide 158. The pressure loading device 152 replaces the control spring 42 of the actuator 12 of FIG. 1 to apply a loading force to the diaphragm 148 in a manner discussed more fully below. However, while a control spring is not shown in the illustrated embodiment of the actuator 112, pressure loaded regulators may be configured to implement control springs and pressure loads in conjunction within an actuator to regulate downstream pressures. The diaphragm 148 includes a disc-shaped diaphragm defining an opening through a central portion thereof. The diaphragm 148 is constructed of a flexible, substantially air-tight, material and its periphery is sealingly secured between the upper and lower housing components 130a, 130b of the housing 130. The diaphragm 148 therefore separates the pressure loading cavity 136 from the control cavity 132. A diaphragm head 160 is disposed on top of the diaphragm 148 and defines an opening disposed concentric with the opening in the diaphragm 148. The diaphragm head 160 further defines a bleed hole 162 there through that functions to place the pressure loading cavity 136 in fluid communication with the control cavity 132 as will be discussed more fully below.

The piston 150 of the disclosed embodiment is a generally elongated rod-shaped member having a sealing cup portion 164 and a yoke 166. The sealing cup portion 164 is concaved and generally disc-shaped and extends circumferentially about a mid-portion of the piston 150, and is located just below the diaphragm 148. The head 160 and the sealing cup 164 are secured to each other and/or the diaphragm 148 at the central opening to form a seal there between. The sealing cup 164 defines a second bleed hole 168 there through that cooperates with the bleed hole 162 to place the cavities 132, 136 in fluid communication. The yoke 166 includes a cavity adapted to accommodate a coupler 172 which connects to a portion of the disc and balancing subassembly 144 to enable attachment between the diaphragm subassembly 142 and the disc and balancing subassembly 144, as will be described.

The piston 150 extends upwardly through the openings in the diaphragm 148 and the diaphragm head 160, respectively. The upwardly extending portion of the piston 150 is slidably disposed in a cavity in the piston guide 158, which maintains the axial alignment of the piston 150 relative to the remainder of the control assembly 120. The lock-up spring seat 156 is disposed at the upper end of the piston 150, with the lock-up spring 154 being retained between the spring seat 156 and the piston guide 158. The lock-up spring 154, spring seat 156 and piston guide 158 are disposed within the tower portion 140 of the upper housing component 130a. The piston guide 158 may be threaded into the tower portion 140 such that it may be rotated to move axially within the tower portion 140 to adjust the tension in the lock-up spring 154. Alternatively or in addition, the top portion of the piston 150 may be threaded with the spring seat 156 being rotatably disposed thereon so that the spring seat 156 may be rotated on the piston 150 to adjust the tension of the lock-up spring 154 or removed to replace the spring 154. The lock-up spring 154 is grounded against the piston guide 158 and applies an upward force to the spring seat 156, which in turn is applied to the piston 150 to provide a biasing force in the direction of the closed or lock-up position of the regulator 110 as shown in FIG. 3.

Figure 2:
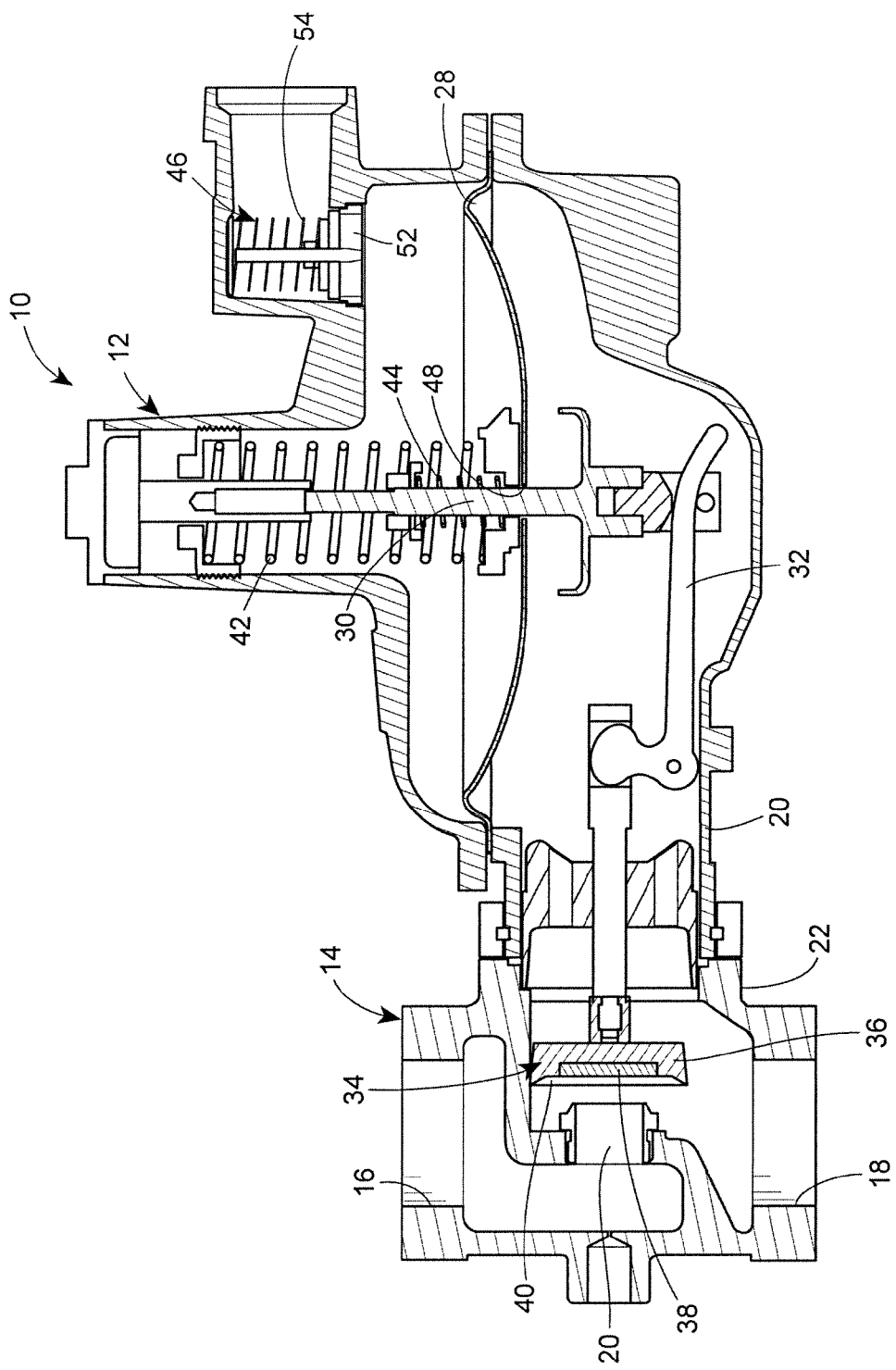
FIG. 2 is a side cross-sectional view of the gas regulator of FIG. 1 in a full open position.

Pressure supplied by the pressure loading device 152 acts against the pressure in the control cavity 132, which is sensed by the diaphragm 148. As stated, the pressure in the control cavity 132 is the same pressure as that which exists at the outlet 118 of the regulator valve 114. Accordingly, the force supplied by the pressure loading device 152 sets the outlet pressure to a desired setpoint or control pressure for the regulator 110. The details of the configuration and the operation of the pressure loading device 152 are discussed more fully below. It should be noted that the diaphragm 148 is installed upside down relative to the diaphragm 28 of FIGS. 1 and 2 because the load pressure will be equal to or greater than the control pressure and act to force the diaphragm 148 downward.

The diaphragm subassembly 142 is operably coupled to the disc and balancing subassembly 144, as mentioned above, via the yoke 166 of the piston 150 and the coupler 172, and by a control arm 176. The disc and balancing subassembly 144 includes an actuator stem 178 that is engaged by the control arm 176 to move the valve disc 122 between the open and closed positions as the diaphragm 148 flexes due to variations in the downstream pressure. Specifically, the actuator stem 178 is a generally linear rod having an end surface engaged by the control arm 176. The control arm 176 is a slightly curved rod and includes a fulcrum end 176a and a free end 176b. The fulcrum end 176a is pivotally coupled to the lower housing component 130b and includes a finger 180 having a rounded end and engaging the end surface of the actuator stem 178. The free end 176b is received between a top portion 172a and a pin 172b of the coupler 172 that is attached to the yoke 166 of the piston 150. Thus, the coupler 172 and the control arm 176 operably connect the disc and balancing subassembly 144 to the diaphragm subassembly 142.

The valve disc 122 of the disc and balancing subassembly 144 is operatively connected to the actuator stem 178, and includes an outer disc portion 182 and a coaxial inner disc portion 184. The outer disc portion 182 includes a recess receiving a sealing insert 186 having a sealing surface that engages the outlet of the valve port 128 to cut off the fluid flow through the regulator valve 114. The disc portions 182, 184 are connected to the actuator stem 178 by balanced port stem 188 and a balancing spring seat 190, and the combined elements are supported for linear movement by a stem guide 192, a retainer plate 194, a balancing diaphragm retainer 196 and a balancing port housing 198. The stem guide 192 is configured to fit within the actuator mouth 134, and includes a generally cylindrical inner portion that slidably retains the actuator stem 178. The stem guide 192 further includes channels 200 therethrough forming a portion of the path placing the outlet 118 in fluid communication with control cavity 132 as discussed further below.

The stem guide 192 engages the retainer plate 194, which is disposed between the stem guide 192 and balanced port housing 198, to hold the retainer plate 194 and balanced port housing 198 in place within the valve mouth 126. The retainer plate 194 is generally circular and includes a central opening through which the balanced port stem 188 passes. The balanced port housing 198 is generally cylindrical and hollow, extends toward the valve port 128, and has an inner diameter sized to slidably receive the valve disc 122. The diaphragm retainer 196 is disposed within the balanced port housing 198 and the opening of the retainer plate 194, and is held in place between a surface of the retainer plate 194 and an inner shoulder of the balanced port housing 198. A disc-shaped balancing diaphragm 202 having a central opening is provided within the balanced port housing 198. The balancing diaphragm 202 is constructed of a flexible, substantially airtight, material and its periphery is secured between the diaphragm retainer 196 and the balanced port housing 198. The inner edge at the central opening of the balancing diaphragm 202 is sealingly secured between the valve disc 122 and the balanced port stem 188. The valve disc 122, balanced port stem 188 and the actuator stem 178 are biased toward the open position of the regulator valve 114 by a balancing spring 204 disposed between the spring seat 190 and a seating surface of the diaphragm retainer 196.

The balancing diaphragm 202 provides a force on the valve disc 122 in the direction of the valve port 118 to compensate for the force applied to the valve disc 122 due to the upstream pressure of the fluid passing through the valve port 118. The inner disc portion 184 has an outer diameter that is smaller than an inner diameter of the outer disc portion 182 to allow fluid to enter a passage 206 of the inner disc portion 184 and a corresponding passage 208 within the balanced port stem 188. The passage 208 opens into the interior of the diaphragm retainer 196 thereby placing the surface of the balancing diaphragm 202 opposite the valve port 118 in fluid communication with the upstream pressure bearing on the valve disc 122. The components of the disc and balancing subassembly 144 are configured so that the force applied by the balancing diaphragm 202 is approximately opposite and equal to the force of the upstream pressure on the valve disc 122 to eliminate any influence of the upstream pressure on the diaphragm subassembly 142 and thereby allowing for more accurate control of the downstream pressure by the gas regulator 110.

Downstream pressure feedback is provided to the control cavity 132 of the actuator 112 via a Pitot tube 210 having a sensing point within the outlet 118 of the regulator valve 114. The Pitot tube 210 extends into the valve mouth 126 and passes through openings through the balanced port housing 198 and the retainer plate 194, respectively. The Pitot tube 210 provides the downstream pressure to the interior of the stem guide 192, and to the control cavity 132 via the channels 200 of the stem guide 192.

As discussed above, the pressure loading device 152 replaces the control spring in the actuator 112 in providing the force opposing the downstream pressure acting on the opposite side of the diaphragm 148. In the illustrated embodiment, the pressure loading device 152 is provided in the form of a regulator configured to receive fluid at an inlet 220 having the upstream pressure and outputting fluid having a specified or desired load pressure at an outlet 222. The inlet 220 and the outlet 222 are defined in a body 224 of the regulator 152 having a valve port 226 disposed between the inlet 220 and the outlet 222. The inlet 220 receives fluid via an upstream pressure supply line 228 having an opposite end connected to an upstream pressure port 230 of the regulator valve 114. The supply line 228 places the inlet 220 of the regulator 152 in fluid communication with the interior of the regulator valve 114 upstream of the valve port 128. The upper housing component 130a of the actuator 112 is modified from the housing of the actuator 12 to include the inlet load pressure port 138 opening into the relief cavity 136 and being connected to the outlet 222 of the regulator 152 via a conduit 234 to place the outlet 222 in fluid communication with the relief cavity 136 and corresponding surface of the diaphragm 148.

A control assembly 236 is provided in the regulator 152 to ensure that the pressure at the outlet 222 of the regulator 152, i.e., the load pressure, is in accordance with a desired load pressure necessary for the actuator 112 to maintain the setpoint downstream pressure. The control assembly 236 senses and regulates the load pressure of the regulator 152. Specifically, the control assembly 236 includes a diaphragm 238, a control spring 240, and a control arm or valve stem 242 having a valve disc 244. The conventional valve disc 244 includes a generally cylindrical body and a conical or frustoconical upper portion connected to the control arm 242 and sized to seat within an opening of the valve port 226 to allow or prevent fluid to pass through the valve body 224. A valve spring 246 disposed between a bottom surface of the valve disc 244 and a seating surface of a valve retainer 248 biases the valve disc 244 toward the closed position as shown. The valve spring 246 allows the valve disc 244 to be displaced downward to unseat from the valve port 226 due to the force of the control spring 240 and allow fluid flow through the valve port 226 as discussed further below. The valve disc 244, valve spring 246 and valve retainer 248 are retained within the body 224 upstream of the valve port 226 by a bottom plate 250 secured to a lower open end of the body 224.

The regulator 152 further includes a bonnet 252 enclosing the diaphragm 238 and control spring 240 above an upper portion of the body 224. The diaphragm 238 includes a disc-shaped diaphragm defining an opening through a central portion thereof. The diaphragm 238 is constructed of a flexible, substantially air-tight, material and its periphery is sealingly engaged between the bonnet 252 and the body 224. The diaphragm 238 therefore separates a control cavity 254 of the regulator 152 from a bonnet cavity 256 containing the control spring 240. A diaphragm head 258 and lower spring seat 260 are disposed on top of the diaphragm 238 and define openings disposed concentric with the opening in the diaphragm 238. A pusher post 262 having a central hub and outwardly extending flange is disposed on the control cavity side of the diaphragm 238, with the hub extending through the openings of the diaphragm 238, head 258 and spring seat 260. The pusher post 262 is secured in place by a retainer spring 264 pressed downwardly over the hub and against an upper surface of the spring seat 260.

The control spring 240 is disposed between the lower spring seat 260 and an upper spring seat 266, with the upper spring seat 266 compressing the control spring 240 against the lower spring seat 260. An adjusting screw 268 is received through a threaded opening at the top of the bonnet 252 and engages a top surface of the upper spring seat 266 to retain the upper spring seat 266 in position within the bonnet 252. Configured in this way, the control spring 240 is grounded against bonnet 252 and applies a downward force to the lower spring seat 260 and the diaphragm 238. In the disclosed embodiment, the force generated by the control spring 240 is adjustable by turning the adjusting screw 268 to raise or lower the upper spring seat 266. As the force of the control spring 240 is adjusted, the load pressure output by the regulator 152 to the actuator 112 is correspondingly adjusted.

The valve stem 242 and valve disc 244 are operatively coupled to the diaphragm 238 and the control spring 240. The pusher post 262 includes a recess within the hub and facing the control cavity 254 and the valve port 226. A soft seat 272 is disposed in the recess of the pusher post 262 and receives the end of the valve stem 242 opposite the valve disc 244. Accordingly, the valve stem 242 and valve disc 244 move upwardly and downwardly as the diaphragm 238 flexes in response to changes in the load pressure. The upper portion of the valve port 226 downstream of the valve disc 244 includes a channel 274 passing therethrough and aligning with a corresponding opening of the body 224 to place the control cavity 254 and, correspondingly, the diaphragm 238 in fluid communication with the outlet 222 to allow the diaphragm 238 to sense the actual load pressure at the outlet 222 and within the relief cavity 136 of the actuator 112.

FIG. 3 depicts the regulator 110 of the present embodiment with the valve disc 122 within the valve body 114 and the valve disc 244 in their closed or lock-up positions. So configured, gas does not flow through either the valve port 128 of the regulator valve 114 or the valve port 226 of the pressure loading device 152. This configuration is achieved within the regulator valve 114 because the outlet pressure, which corresponds to the pressure in the control cavity 136 of the housing 126 and sensed by the diaphragm 146, is greater than the force applied by the load pressure from the pressure loading device 152. Accordingly, the downstream pressure at the outlet 118 forces the diaphragm 148 and the piston 150 into the closed position. Similarly, the configuration is achieved within the pressure loading device 152 because the load pressure, which corresponds to the pressure in the control cavity 154 of the body 224, plus the force of the valve spring 246 is greater than the force applied by the control spring 240 to the diaphragm 23, and load pressure forces the diaphragm 238 and the valve disc 244 to the closed position. Once the actuator 112 and the pressure loading device 152 are closed, pressure will bleed through the bleed holes 162, 168 until the load pressure and the outlet pressure equalize. When the pressure on both sides of the diaphragm 148 are equal, the lock-up spring 154 will bias the diaphragm assembly 142 upward to retain the valve disc 122 in the closed position.

When an operating demand is placed on the gas distribution system, e.g., a user begins operating an appliance such as a furnace, a stove, etc., the appliance draws gas from the outlet 118 and correspondingly the control cavity 132 of the actuator 112, thereby reducing the pressure that is sensed by the diaphragm 148. As the pressure sensed by the control cavity side of the diaphragm 148 decreases, a force imbalance occurs between a load pressure force and an outlet pressure force on the diaphragm 148 such that the load pressure overcomes the forces of the lock-up spring 154 and displaces the diaphragm 148 and piston 150 downward relative to the housing 130 as shown in FIG. 4. This causes the control arm 176 to pivot in the clockwise direction, which in turn rotates the finger 180 relative to the surface 182 of the actuator stem 178. This allows the actuator stem 178 and the valve disc 122 to move away from the outlet 124 of the valve port 128 due to the force of the balancing spring 200 to open the regulator valve 114.

As the diaphragm 148 displaces downwardly, the volume within the pressure loading cavity 136 increases, and the increased volume of the pressure loading cavity 136 along with the bleeding of gas into the control cavity 132 through the bleed holes 162, 168 cause a corresponding drop in the load pressure within the cavity 136. At the same time, the load pressure decrease causes a force imbalance to occur between the control spring force and the load pressure force on the diaphragm 238 of the pressure loading device 152 such that the control spring 240 expands and displaces the diaphragm 238 downward relative to the body 224. The displacement of the diaphragm 238 forces the valve stem 242 and valve disc 244 downward and causes the valve disc 244 to become unseated and allow fluid to flow through the valve port 226 and into the relief cavity 136 of the actuator 112. The fluid flowing into the relief cavity 136 increases the load pressure being applied to the diaphragm 148 so that the force applied to the diaphragm 148 does not decrease as is the case in the actuator 112 wherein the force applied by the control spring 42 decreases as the spring 42 expands to open the regulator valve 14.

When the demand is removed from the gas distribution system, such as when the user shuts off the appliance, the regulator 110 initially responds by decreasing the fluid flow through the regulator valve 114. As gas continues to flow through the valve port 128 and to the downstream portion of the system, the pressure increases at the outlet 118 and, correspondingly, in the control cavity 132 of the actuator 112. As the pressure sensed by the diaphragm 148 increases and overcomes the load pressure force, the diaphragm 148 and piston 150 are forced upward relative to the housing 130. The upward movement causes the control arm 176 to pivot in the counterclockwise direction, which in turn drives the actuator stem 178 and the valve disc 122 toward the valve port 128 to reduce the fluid flow through the regulator valve 114. Under normal operating conditions, the outlet pressure will drop to approximately the actuator setpoint pressure and remain there until the downstream demand changes in a manner that causes a response from by the actuator 112.

As the diaphragm 148 displaces upwardly, the volume within the pressure loading cavity 136 decreases, and the decreased volume of the pressure loading cavity 136 causes a corresponding increase in the load pressure within the pressure loading cavity 136 and within the control cavity 254 of the regulator 152. The load pressure increase against the diaphragm 238 eventually overcomes the force of the control spring 240, causing the diaphragm 240 to move upward. The upward movement of the diaphragm 238 allows the valve disc 244 to also move upwardly to reduce the fluid flow through the regulator 152. Under normal operating conditions, the load pressure will equalize with the pressure in the control cavity 132 and remain there until the downstream demand changes in a manner that causes a response from by the actuator 112 and a corresponding response by the regulator 152.

Several benefits may be derived from implementing pressure loading and balanced trim within a regulator as described above. For example, regulators in accordance with the present disclosure may be implemented in systems where higher inlet pressures are anticipated while maintaining a desired level of control and accuracy over the resulting downstream pressures. At higher inlet pressures, the force applied to the valve disc 122 by the balancing diaphragm increases correspondingly to prevent influence on the control assembly 120 by the upstream pressures. The regulators may also be implemented where large upstream pressure variations are expected because the balanced trim substantially eliminates outlet pressure sensitivity to input pressure variations. Consequently, the balanced trim allows for higher rated capacities for the regulators and higher accuracy in the regulation of the downstream pressures by the regulator. Pressure loading also allows for a higher rated capacity for the regulator. The effects of "droop" on a regulator's ability to maintain the outlet control pressure at the desired setpoint pressure are reduced by the ability of the pressure loading device to maintain a more consistent load on the diaphragm of the regulator as compared to the variations in the amount of force and pressure provided by control springs. Moreover, the load consistency results in an increase in the accuracy of the control provided by the regulator.

While the preceding text sets forth a detailed description of numerous different embodiments of the invention, it should be understood that the legal scope of the invention is defined by the words of the claims set forth at the end of a patent claiming priority hereto. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

What is claimed:

1. A fluid regulating device, comprising:
   a valve having a first inlet, a first outlet, and a first valve port disposed between the first inlet and the first outlet;
   an actuator coupled to the valve, the actuator comprising:
   a housing coupled to the valve,
   a first valve disc disposed within the valve and adapted for displacement between a closed position engaging the first valve port and an open position disposed away from the first valve port, and
   a first diaphragm disposed within the housing and dividing the housing into a first cavity and a second cavity, with the first diaphragm being operatively coupled to the first valve disc, and with the first cavity of the housing being in fluid communication with the first outlet of the valve; and
   a pressure loading device coupled to the valve and to the actuator, the pressure loading device comprising:
   a body having a second inlet, a second outlet, and a second valve port disposed between the second inlet and the second outlet, wherein the second inlet is in fluid communication with the first inlet, and the second outlet is in fluid communication with the second cavity of the housing;
   a bonnet coupled to the body, a second valve disc disposed within the body and adapted for displacement between a closed position engaging the second valve port and an open position disposed away from the second valve port, a second diaphragm disposed within the bonnet and dividing the bonnet into a first cavity and a second cavity, with the second diaphragm being operatively coupled to the second valve disc, and with the first cavity of the bonnet being in fluid communication with the second outlet when the second valve disc is in the closed position and in the open position, and a control spring disposed within the second cavity of the bonnet and engaging the second diaphragm, wherein the second diaphragm and the control spring are configured to cause the second valve disc to move toward its open position when the pressure at the second outlet decreases and to cause the second valve disc to move toward its closed position when the pressure at the second outlet increases to maintain a pressure within the second cavity of the actuator approximately equal to a load pressure, and wherein the actuator is configured to cause the first valve disc to move toward its open position when the pressure at the first outlet decreases and to cause the first valve disc to move toward its closed position when the pressure at the first outlet increases to maintain the pressure at the first outlet approximately equal to a setpoint pressure.

2. A fluid regulating device in accordance with claim 1, wherein the actuator comprises a control arm pivotally mounted within the housing and operatively coupling the first diaphragm to the first valve disc, wherein the first diaphragm causes the control arm to rotate in a first direction to move the first valve disc toward its open position when the pressure at the first outlet decreases and causes the control arm to rotate in a second direction to move the first valve disc toward its closed position when the pressure at the first outlet decreases.

3. A fluid regulating device in accordance with claim 1, comprising a Pitot tube having a first end disposed within the first outlet of the valve and a second end in fluid communication with the first cavity of the housing to place the first cavity of the housing in fluid communication with the first outlet of the valve.

4. A fluid regulating device in accordance with claim 1, comprising a balancing diaphragm operatively connected to the first valve disc and having a first side in fluid communication with an upstream pressure of fluid flowing through the first valve port, wherein the upstream pressure applies a force to the first valve disc in the direction of the open position, and the upstream pressure acting on the first side of the balancing diaphragm applies a force to the first valve disc in the direction of the closed position and approximately equal to the force of the upstream pressure on first valve disc.

5. A fluid regulating device in accordance with claim 1, wherein the pressure loading device comprises a valve stem operatively coupling the second diaphragm to the second valve disc, wherein the second diaphragm causes the valve stem to move in a first direction to move the first valve disc toward its open position when the pressure at the second outlet decreases and causes the valve stem to move in a second direction to move the second valve disc toward its closed position when the pressure at the second outlet decreases.

6. A fluid regulating device in accordance with claim 1, wherein the pressure loading device comprises a valve spring engaging the second valve disc to bias the second valve disc toward its closed position against the biasing force of the control spring.

7. A fluid regulating device in accordance with claim 1, wherein the pressure loading device comprises a control spring adjustment mechanism engaging the control spring for adjustment of a force applied by the control spring to the second diaphragm to increase and decrease the load pressure provided by the pressure loading device to the second cavity of the housing and, correspondingly to increase and decrease the setpoint pressure of the fluid regulating device.

8. A fluid regulating device in accordance with claim 7, wherein the control spring adjustment mechanism comprises an adjusting screw received through a threaded opening at the top of the bonnet and operatively coupled to the control spring, wherein the force applied by the control spring to the second diaphragm is increased when the adjusting screw is rotated in a first direction and decreased when the adjusting screw is rotated in a second direction.

9. A fluid regulating device in accordance with claim 1, wherein the first cavity of the bonnet is not in fluid communication with the first cavity of the housing.

10. In a fluid regulating device having a valve and an actuator coupled to the valve, wherein the valve has a first inlet, a first outlet, and a first valve port disposed between the first inlet and the first outlet, and the actuator has a first valve disc adapted for displacement between a closed position engaging the first valve port and an open position disposed away from the first valve port, and a first diaphragm dividing the actuator into a first cavity and a second cavity with the first cavity being in fluid communication with the first outlet of the valve, wherein the first diaphragm is operatively coupled to the first valve disc to move the first valve disc between the open and closed positions, the improvement comprising:

a pressure loading device coupled to the valve and to the actuator, the pressure loading device comprising:

a body having a second inlet, a second outlet, and a second valve port disposed between the second inlet and the second outlet, wherein the second inlet is in fluid communication with the first inlet, and the second outlet is in fluid communication with the second cavity of the actuator;

a bonnet coupled to the body, a second valve disc disposed within the body and adapted for displacement between a closed position engaging the second valve port and an open position disposed away from the second valve port, a second diaphragm disposed within the bonnet and dividing the bonnet into a first cavity and a second cavity, with the second diaphragm being operatively coupled to the second valve disc, and with the first cavity of the bonnet being in fluid communication with the second outlet when the second valve disc is in the closed position and in the open position, and a control spring disposed within the second cavity of the bonnet and engaging the second diaphragm, wherein the second diaphragm and the control spring are configured to cause the second valve disc to move toward its open position when the pressure at the second outlet decreases and to cause the second valve disc to move toward its closed position when the pressure at the second outlet increases to maintain a pressure within the second cavity of the actuator approximately equal to a load pressure, and wherein the actuator is configured with the load pressure bearing upon the first diaphragm to cause the first valve disc to move toward its open position when the pressure at the first outlet decreases and to cause the first valve disc to move toward its closed position when the pressure at the first outlet increases to maintain the pressure at the first outlet approximately equal to a setpoint pressure.

11. In a fluid regulating device in accordance with claim 10, the pressure loading device comprising a valve stem operatively coupling the second diaphragm to the second valve disc, wherein the second diaphragm causes the valve stem to move in a first direction to move the first valve disc toward its open position when the pressure at the second outlet decreases and causes the valve stem to move in a second direction to move the second valve disc toward its closed position when the pressure at the second outlet decreases.

12. In a fluid regulating device in accordance with claim 10, the pressure loading device comprising a valve spring engaging the second valve disc to bias the second valve disc toward its closed position against the biasing force of the control spring.

13. In a fluid regulating device in accordance with claim 10, the pressure loading device comprising a control spring adjustment mechanism engaging the control spring for adjustment of a force applied by the control spring to the second diaphragm to increase and decrease the load pressure provided by the pressure loading device to the second cavity of the housing and, correspondingly to increase and decrease the setpoint pressure of the fluid regulating device.

14. In a fluid regulating device in accordance with claim 13, the control spring adjustment mechanism comprising an adjusting screw received through a threaded opening at the top of the bonnet and operatively coupled to the control spring, wherein the force applied by the control spring to the second diaphragm is increased when the adjusting screw is rotated in a first direction and decreased when the adjusting screw is rotated in a second direction.

15. In a fluid regulating device in accordance with claim 10, wherein the first cavity of the bonnet is not in fluid communication with the first cavity of the housing.

16. A fluid regulating device, comprising:
a valve having a first inlet, a first outlet, and a first valve port disposed between the first inlet and the first outlet;
an actuator coupled to the valve, the actuator comprising:
a first valve disc disposed within the valve and adapted for displacement between a closed position engaging the first valve port and an open position disposed away from the first valve port, and
a first diaphragm operatively coupled to the first valve disc to move the first valve disc between the open and closed positions, wherein a first surface of the first diaphragm is in fluid communication with the first outlet of the valve; and
a pressure loading device coupled to the valve and to the actuator, the pressure loading device having a second inlet, a second outlet, and a second valve port disposed between the second inlet and the second outlet, with the second inlet being in fluid communication with the first inlet, and the second outlet being in fluid communication with a second surface of the first diaphragm, where the pressure loading device is configured to increase a fluid flow through the pressure loading device when the pressure at the second outlet is less than a load pressure, wherein the second inlet is in fluid communication with the first inlet, and the second outlet is in fluid communication with the second cavity of the housing, and wherein the pressure loading device further includes a second valve disc and a second diaphragm, the second diaphragm separating a first cavity of the pressure loading device from a second cavity of the pressure loading device, the second diaphragm being operatively coupled to the second valve disc to move the second valve disc between a closed position engaging the second valve port and an open position disposed away from the second valve port,
wherein the first cavity of the pressure loading device is in fluid communication with the second outlet and the second surface of the first diaphragm when the second valve disc is in the closed position and in the open position,
wherein the pressure loading device is configured to increase a fluid flow through the device when the pressure at the second outlet decreases and to decrease a fluid flow through the device when the pressure at the second outlet increases to maintain a pressure against the second surface of the first diaphragm approximately equal to a load pressure, and
wherein the actuator is configured to cause the first valve disc to move toward its open position when the pressure at the first outlet decreases and to cause the first valve disc to move toward its closed position when the pressure at the first outlet increases to maintain the pressure at the first outlet approximately equal to a setpoint pressure.

17. A fluid regulating device in accordance with claim 16, wherein the actuator comprises a control arm pivotally mounted within the housing and operatively coupling the first diaphragm to the first valve disc, wherein the first diaphragm causes the control arm to rotate in a first direction to move the first valve disc toward its open position when the pressure at the first outlet decreases and causes the control arm to rotate in a second direction to move the first valve disc toward its closed position when the pressure at the first outlet decreases.

18. A fluid regulating device in accordance with claim 16, comprising a balancing diaphragm operatively connected to the first valve disc and having a first side in fluid communication with an upstream pressure of fluid flowing through the first valve port, wherein the upstream pressure applies a force to the first valve disc in the direction of the open position, and the upstream pressure acting on the first side of the balancing diaphragm applies a force to the first valve disc in the direction of the closed position and approximately equal to the force of the upstream pressure on first valve disc.

19. A fluid regulating device in accordance with claim 16, wherein the pressure loading device comprises:
a body having the second inlet, the second outlet and the second valve port disposed between the second inlet and the second outlet;
the second valve disc being disposed within the body; and
a control spring engaging a second surface of the second diaphragm, wherein the second diaphragm and the control spring are configured to cause the second valve disc to move toward its open position and increase the fluid flow through the second valve port when the pressure at the second outlet decreases and to cause the second valve disc to move toward its closed position and decrease the fluid flow through the second valve port when the pressure at the second outlet increases to maintain the pressure against the second surface of the first diaphragm approximately equal to the load pressure.

20. A fluid regulating device in accordance with claim 19, wherein the pressure loading device comprises a valve stem operatively coupling the second diaphragm to the second valve disc, wherein the second diaphragm causes the valve stem to move in a first direction to move the first valve disc toward its open position when the pressure at the second outlet decreases and causes the valve stem to move in a second direction to move the second valve disc toward its closed position when the pressure at the second outlet decreases.

21. A fluid regulating device in accordance with claim 19, wherein the pressure loading device comprises a valve spring engaging the second valve disc to bias the second valve disc toward its closed position against the biasing force of the control spring.

22. A fluid regulating device in accordance with claim 19, wherein the pressure loading device comprises a control spring adjustment mechanism engaging the control spring for adjustment of a force applied by the control spring to the second diaphragm to increase and decrease the load pressure provided by the pressure loading device to the second cavity of the housing and, correspondingly to increase and decrease the setpoint pressure of the fluid regulating device.

23. A fluid regulating device in accordance with claim 22, wherein the control spring adjustment mechanism comprises an adjusting screw received through a threaded opening of the pressure loading device and operatively coupled to the control spring, wherein the force applied by the control spring to the second diaphragm is increased when the adjusting screw is rotated in a first direction and decreased when the adjusting screw is rotated in a second direction.

24. A fluid regulating device in accordance with claim 16, wherein the first cavity of the pressure loading device is not in fluid communication with the first surface of the first diaphragm.

25. A fluid regulating device, comprising:
a valve having a first inlet, a first outlet, and a first valve port disposed between the first inlet and the first outlet;
an actuator coupled to the valve, the actuator comprising:
a housing coupled to the valve,
a first valve disc disposed within the valve and adapted for displacement between a closed position engaging the first valve port and an open position disposed away from the first valve port, and
a first diaphragm disposed within the housing and dividing the housing into a first cavity and a second cavity, with the first diaphragm being operatively coupled to the first valve disc, and with the first cavity of the housing being in fluid communication with the first outlet of the valve; and
a pressure loading device coupled to the valve and to the actuator, the pressure loading device comprising:
a body having a second inlet, a second outlet, and a second valve port disposed between the second inlet and the second outlet, wherein the second inlet is in fluid communication with the first inlet, and the second outlet is in fluid communication with the second cavity of the housing;
a bonnet coupled to the body,
a second valve disc disposed within the body and adapted for displacement between a closed position engaging the second valve port and an open position disposed away from the second valve port,
a second diaphragm disposed within the bonnet and dividing the bonnet into a first cavity and a second cavity, with the second diaphragm being operatively coupled to the second valve disc, and with the first cavity of the bonnet being in fluid communication with the second outlet, and
a control spring disposed within the second cavity of the bonnet and engaging the second diaphragm,
wherein the second diaphragm and the control spring are configured to cause the second valve disc to move toward its open position when the pressure at the second outlet decreases and to cause the second valve disc to move toward its closed position when the pressure at the second outlet increases to maintain a pressure within the second cavity of the actuator approximately equal to a load pressure, and
wherein the actuator is configured to cause the first valve disc to move toward its open position when the pressure at the first outlet decreases and to cause the first valve disc to move toward its closed position when the pressure at the first outlet increases to maintain the pressure at the first outlet approximately equal to a setpoint pressure, and
further comprising a Pitot tube having a first end disposed within the first outlet of the valve and a second end in fluid communication with the first cavity of the housing to place the first cavity of the housing in fluid communication with the first outlet of the valve.

26. A fluid regulating device, comprising:
a valve having a first inlet, a first outlet, and a first valve port disposed between the first inlet and the first outlet;
an actuator coupled to the valve, the actuator comprising:
a housing coupled to the valve,
a first valve disc disposed within the valve and adapted for displacement between a closed position engaging the first valve port and an open position disposed away from the first valve port, and
a first diaphragm disposed within the housing and dividing the housing into a first cavity and a second cavity, with the first diaphragm being operatively coupled to the first valve disc, and with the first cavity of the housing being in fluid communication with the first outlet of the valve; and
a pressure loading device coupled to the valve and to the actuator, the pressure loading device comprising:
a body having a second inlet, a second outlet, and a second valve port disposed between the second inlet and the second outlet, wherein the second inlet is in fluid communication with the first inlet, and the second outlet is in fluid communication with the second cavity of the housing;
a bonnet coupled to the body,
a second valve disc disposed within the body and adapted for displacement between a closed position engaging the second valve port and an open position disposed away from the second valve port,
a second diaphragm disposed within the bonnet and dividing the bonnet into a first cavity and a second cavity, with the second diaphragm being operatively coupled to the second valve disc, and with the first cavity of the bonnet being in fluid communication with the second outlet, and
a control spring disposed within the second cavity of the bonnet and engaging the second diaphragm,
wherein the second diaphragm and the control spring are configured to cause the second valve disc to move toward its open position when the pressure at the second outlet decreases and to cause the second valve disc to move toward its closed position when the pressure at the second outlet increases to maintain a pressure within the second cavity of the actuator approximately equal to a load pressure, and
wherein the actuator is configured to cause the first valve disc to move toward its open position when the pressure at the first outlet decreases and to cause the first valve disc to move toward its closed position when the pressure at the first outlet increases to maintain the pressure at the first outlet approximately equal to a setpoint pressure, and further comprising a balancing diaphragm operatively connected to the first valve disc and having a first side in fluid communication with an upstream pressure of fluid flowing through the first valve port, wherein the upstream pressure applies a force to the first valve disc in the direction of the open position, and the upstream pressure acting on the first side of the balancing diaphragm applies a force to the first valve disc in the direction of the closed position and approximately equal to the force of the upstream pressure on first valve disc.

27. A fluid regulating device, comprising:

a valve having a first inlet, a first outlet, and a first valve port disposed between the first inlet and the first outlet;

an actuator coupled to the valve, the actuator comprising:

a first valve disc disposed within the valve and adapted for displacement between a closed position engaging the first valve port and an open position disposed away from the first valve port, and a first diaphragm operatively coupled to the first valve disc to move the first valve disc between the open and closed positions, wherein a first surface of the first diaphragm is in fluid communication with the first outlet of the valve; and a pressure loading device coupled to the valve and to the actuator, the pressure loading device having a second inlet and a second outlet with the second inlet being in fluid communication with the first inlet, and the second outlet being in fluid communication with a second surface of the first diaphragm, where the pressure loading device is configured to increase a fluid flow through the pressure loading device when the pressure at the second outlet is less than a load pressure and a second valve port disposed between the second inlet and the second outlet, wherein the second inlet is in fluid communication with the first inlet, and the second outlet is in fluid communication with the second cavity of the housing;

wherein the pressure loading device is configured to increase a fluid flow through the device when the pressure at the second outlet decreases and to decrease a fluid flow through the device when the pressure at the second outlet increases to maintain a pressure against the second surface of the first diaphragm approximately equal to a load pressure, and wherein the actuator is configured to cause the first valve disc to move toward its open position when the pressure at the first outlet decreases and to cause the first valve disc to move toward its closed position when the pressure at the first outlet increases to maintain the pressure at the first outlet approximately equal to a setpoint pressure, and further comprising a balancing diaphragm operatively connected to the first valve disc and having a first side in fluid communication with an upstream pressure of fluid flowing through the first valve port, wherein the upstream pressure applies a force to the first valve disc in the direction of the open position, and the upstream pressure acting on the first side of the balancing diaphragm applies a force to the first valve disc in the direction of the closed position and approximately equal to the force of the upstream pressure on first valve disc.

* * * * *

UNITED STATES PATENT AND TRADEMARK OFFICE
CERTIFICATE OF CORRECTION

PATENT NO. : 8,240,327 B2 Page 1 of 1
APPLICATION NO. : 12/427435
DATED : August 14, 2012
INVENTOR(S) : James C. Hawkins et al.

It is certified that error appears in the above-identified patent and that said Letters Patent is hereby corrected as shown below:

In the Specification:

At Column 3, line 1, "know" should be -- known --.

Signed and Sealed this
Sixth Day of May, 2014

Michelle K. Lee
*Deputy Director of the United States Patent and Trademark Office*